(12) United States Patent
Liu et al.

(10) Patent No.: US 7,650,612 B2
(45) Date of Patent: Jan. 19, 2010

(54) TRANSPORTATION ARM DEVICE FOR CARRYING DISCS

(75) Inventors: Ming-Hsun Liu, Taipei (TW); Chung Hsuan Tsai, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 0 days.

(21) Appl. No.: 12/408,778

(22) Filed: Mar. 23, 2009

(65) Prior Publication Data

US 2009/0178066 A1    Jul. 9, 2009

Related U.S. Application Data

(63) Continuation-in-part of application No. 11/313,946, filed on Dec. 22, 2005, now Pat. No. 7,509,660.

(51) Int. Cl.
  *G11B 17/03* (2006.01)
(52) U.S. Cl. ...................................... 720/615
(58) Field of Classification Search ................... 720/615
  See application file for complete search history.

(56) References Cited

U.S. PATENT DOCUMENTS 5,914,918 A * 6/1999 Lee et al. ................. 369/30.32
5,959,959 A    9/1999 Watanabe
6,141,298 A   10/2000 Miller
6,321,649 B1 * 11/2001 Vangen et al. ................. 101/35
6,636,462 B1  10/2003 Drynkin et al.
6,760,052 B2 *  7/2004 Cummins et al. ........... 347/171
6,822,932 B2 * 11/2004 Miller ...................... 369/30.31
7,127,725 B2 * 10/2006 Lee ............................. 720/600
2003/0002400 A1 * 1/2003 Klein ...................... 369/30.55

* cited by examiner

*Primary Examiner*—Mark Blouin
(74) *Attorney, Agent, or Firm*—Alan Kamrath; Kamrath & Associates PA

(57) ABSTRACT

A transport arm device for carrying at least one disc includes a driving mechanism, a sway control member, and a swaying mechanism. The sway control member comprises a hole substantially in the middle of the sway control member for receiving a portion of the driving mechanism and two leaf springs extending up from two sides of the sway control member respectively. The swaying mechanism is capable of grabbing the discs. The swaying mechanism comprises a rotating connection for engaging with a suspension of the transport arm device. The two leaf springs are contacted with the swaying mechanism. The sway control member is moved by the driving mechanism so as to rotate the swaying mechanism along a rotary axis on the rotating connection, and the two leaf springs provide elasticity for the swaying mechanism rotating back.

17 Claims, 13 Drawing Sheets

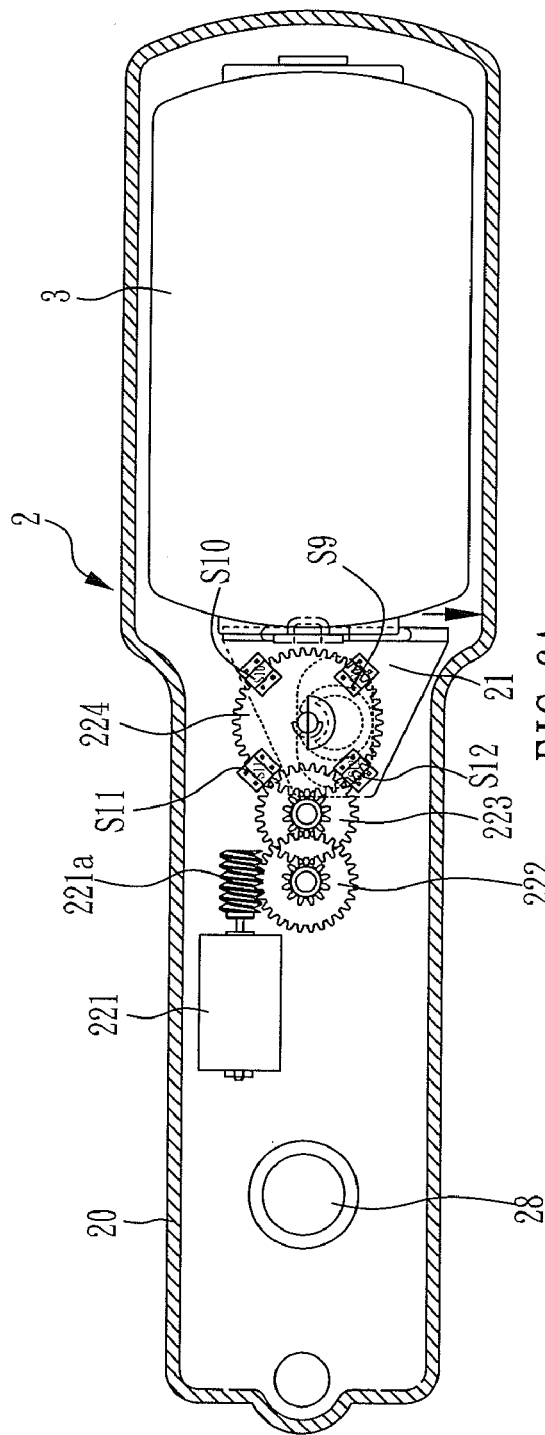
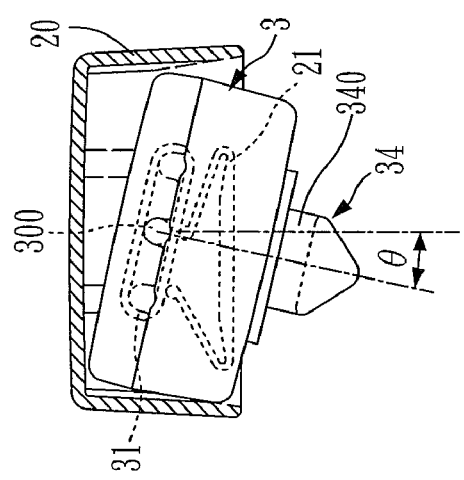
FIG. 6A
FIG. 6B

TRANSPORTATION ARM DEVICE FOR CARRYING DISCS

CROSS-REFERENCE

This application is a continuation-in-part (CIP) of application Ser. No. 11/313,946, filed on Dec. 22, 2005, and issued on Mar. 24, 2009 as U.S. Pat. No. 7,509,660. The prior application is herewith incorporated by reference in its entirety.

BACKGROUND OF THE INVENTION

1. Field of the Invention

The present invention relates to a transport arm device and, more particularly, to a transport arm device for one or more carrying discs at one time.

2. Description of the Related Art

As more and more people become use to dealing with digital information in their daily lives, different information storage devices are being produced. Considering the low cost of discs and improvements in optical disk drives, the information storage device that most people use is a disc.

If the disc tray of the optical disk drive extends out completely, the mechanical arm can retrieve the disc. But as more and more computers are designed to be smaller, their disc trays do not extend out completely. FIG. 1A shows a disc tray 11a extending out completely. In this type of the optical disk drive 11, the disc tray 11a for placing a disc 4 not only extends out completely but also keeps a distance D with the surface panel of the optical disk drive 11. Therefore, the disc 4 can be retrieved by the mechanical arm using conventional way of horizontal retrieving without any difficulties. On the other hand, FIG. 1B shows a disc tray 11b extended incompletely. In this type of the optical disk drive 11', the disc tray 11b for placing the disc 4 is not extended completely but remain inside a distance D' from the surface panel of the optical disk drive 11'. Therefore, the disc 4 can't be retrieved by the mechanical arm using the conventional way of horizontal retrieving, because the mechanical arm would be blocked by the surface panel of the optical disk drive 11'.

In addition, in the prior art, the conventional transport arm device can only carry one disc at one time.

SUMMARY OF THE INVENTION

A main objective of the present invention is to provide a transport arm device for carrying at least one disc (such as CD or DVD, or the like), which can be swayed with an angle to carry the disc(s).

Another objective of the present invention is to provide transport arm device for carrying more than one disc.

The present invention provides a transport arm device for carrying at least one disc comprising a driving means, a sway control member, and a swaying mechanism. The sway control member comprises a hole in substantial middle of the sway control member for receiving a portion of the driving means and two leaf springs extending up from two sides of the sway control member respectively. The swaying mechanism is capable of grabbing the discs. The swaying mechanism comprises a rotating connection for engaging with a suspension of the transport arm device, wherein the two leaf springs are contacted with the swaying mechanism. The sway control member is moved by the driving means so as to rotate the swaying mechanism along a rotary axis on the rotating connection, and the two leaf springs provide elasticity for the swaying mechanism rotating back.

Preferably, the portion of the driving means is a cam, and the driving means comprises a gear engaged with the cam and a motor comprising a bolt in one end of the motor for driving the gear.

The transport arm device may further comprise a main body housing for covering the driving means and the sway control member, wherein the suspension is extended from a top plane of the main body housing, and the main body housing limit the swaying mechanism to be rotated within a specific angle.

Preferably, the two leaf springs are contacted with the rotating connection, and the rotating connection is extruding out of a swaying mechanism housing of the swaying mechanism.

The swaying mechanism comprises a swaying mechanism housing having a cone-shaped carrying head extending out from the swaying mechanism housing, at least one grabbing controller having a disc grabbing portion disposed in the cone-shaped carrying head, and at least one moving element having a pushing portion disposed in the cone-shaped carrying head; and wherein the cone-shaped carrying head comprises an opening for receiving the at least one disc when the disc grabbing portion being pushed by the pushing portion.

In this embodiment, the swaying mechanism comprises a fixing member for fixing the at least one moving element and the at least one grabbing controller, and the fixing member is fastened in the swaying mechanism housing.

When there are three discs to be carried, the swaying mechanism comprises a first sensor for sensing the first disc of the three discs, a second sensor for sensing the second disc of the three discs, and a third sensor for sensing the third disc of the three discs.

The transport arm device may further comprise a forth sensor and a fifth sensor for sensing the swaying mechanism being rotated in forward and backward respectively.

The transport arm device comprises a through hole to be engaged with a vertical control bolt so as to rotationally move the transport arm device between two or more processing systems. The transport arm device may further comprise a sixth sensor and a seventh sensor for sensing the transport arm device in left and right direction respectively.

Other objects, advantages, and novel features of the invention will become more apparent from the following detailed description when taken in conjunction with the accompanying drawings.

BRIEF DESCRIPTION OF THE DRAWINGS

FIGS. 5A-5B and 6A-6B are cross-section views of a transport arm device in accordance with the present invention when a swaying mechanism is rotating with an angel.

DETAILED DESCRIPTION OF THE PREFERRED EMBODIMENT

Figure 1A:
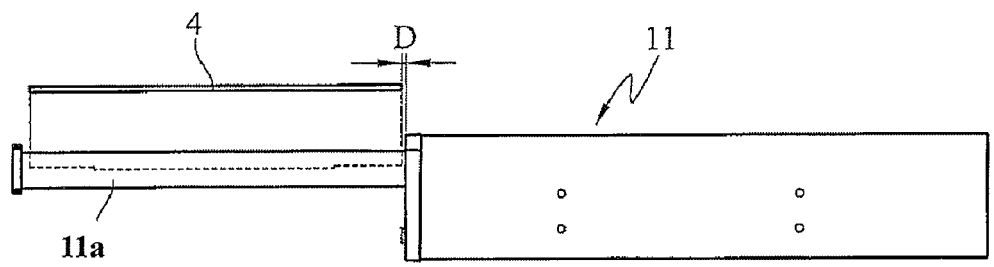
FIG. 1A shows the conventional disc tray extending completely out from the optical disk processing system.
Figure 1B:
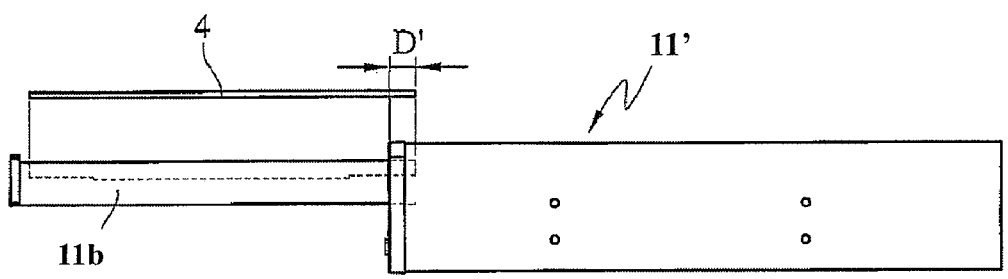
FIG. 1B shows the conventional disc tray extending incompletely out from the optical disk drive.
Figure 2:
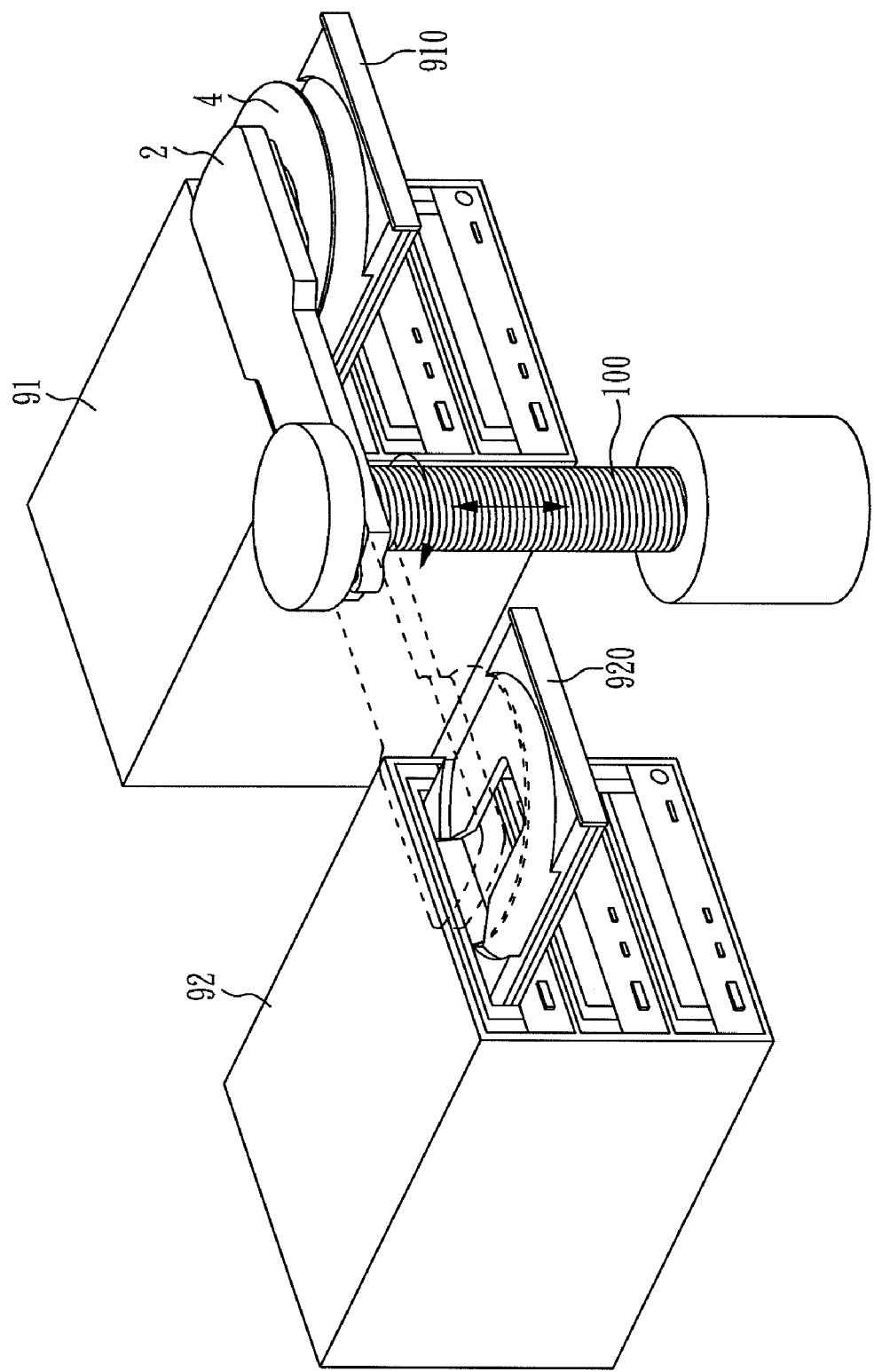
FIG. 2 shows a perspective view of a transport arm device for carrying at least one disc rotating between two processing systems.

FIG. 2 shows a transport arm device 2 in accordance with the present invention for carrying at least one disc 4. The transport arm device 2 is capable of rotating horizontally between two processing systems 91 and 92 for carrying the disc 4 to be put into trays 910 and 920 respectively, which will be described in more detail.

Figure 3:
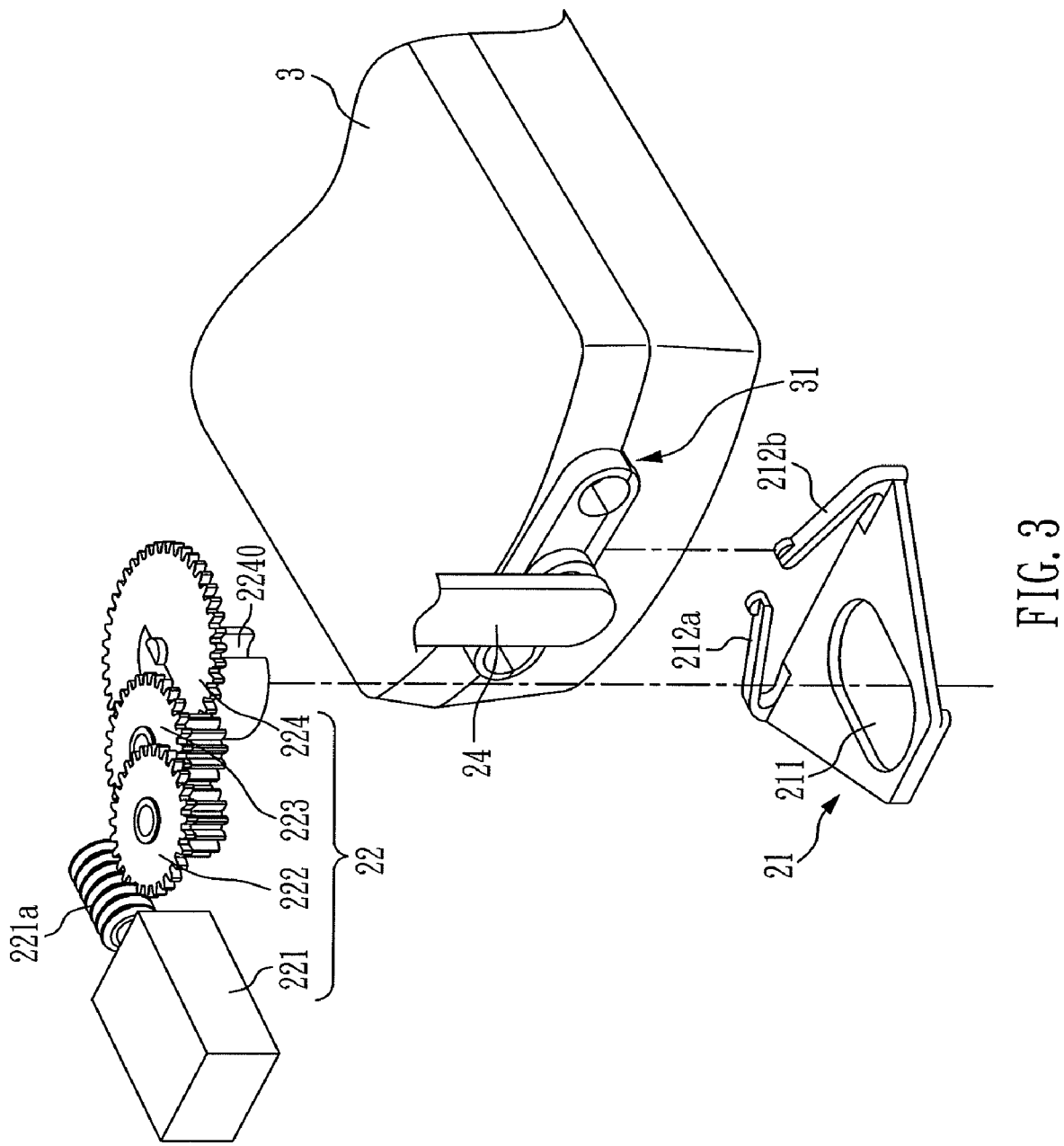
FIG. 3 shows a part of the transport arm device, which is an exploded view of a driving means, a sway control member and a swaying mechanism according to the present invention.
Figure 4A:
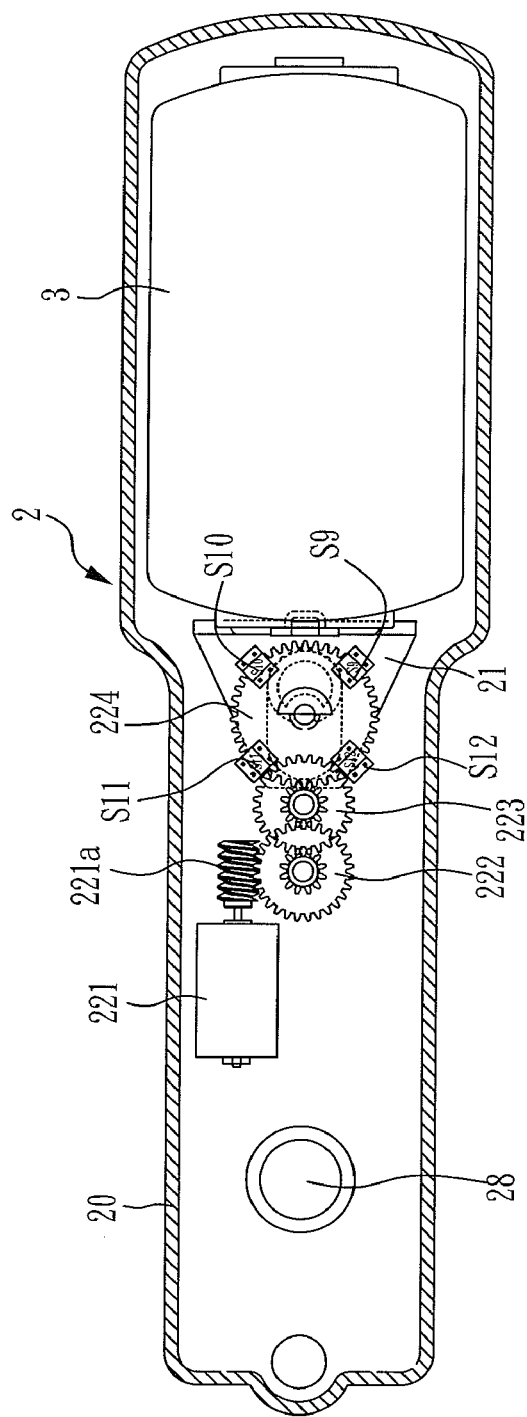
FIG. 4A-4B are cross-section views of a transport arm device in accordance with the present invention.
Figure 4B:
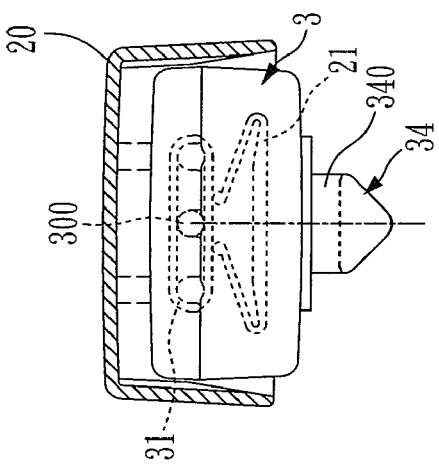

Referring to FIGS. 3, 4A, and 4B, the transport arm device 2 comprises a driving mechanism 22, a sway control member 21, and a swaying mechanism 3. The sway control member 21 comprises a hole 211 substantially in the middle of the sway control member 21 for receiving a portion 2240 of the driving mechanism 22. Two leaf springs 212a and 212b extend up from two sides of the sway control member 21 respectively. The swaying mechanism 3 is capable of grabbing discs. The swaying mechanism 3 comprises a rotating connection 31 for engaging with a suspension 24. The two leaf springs 212a and 212b are contacted with the swaying mechanism 3. Preferably, the rotating connection 31 is extruded out of a swaying mechanism housing 30 of the swaying mechanism 3, and the two leaf springs 212a and 212b are contacted with the rotating connection 31.

Figure 5A:
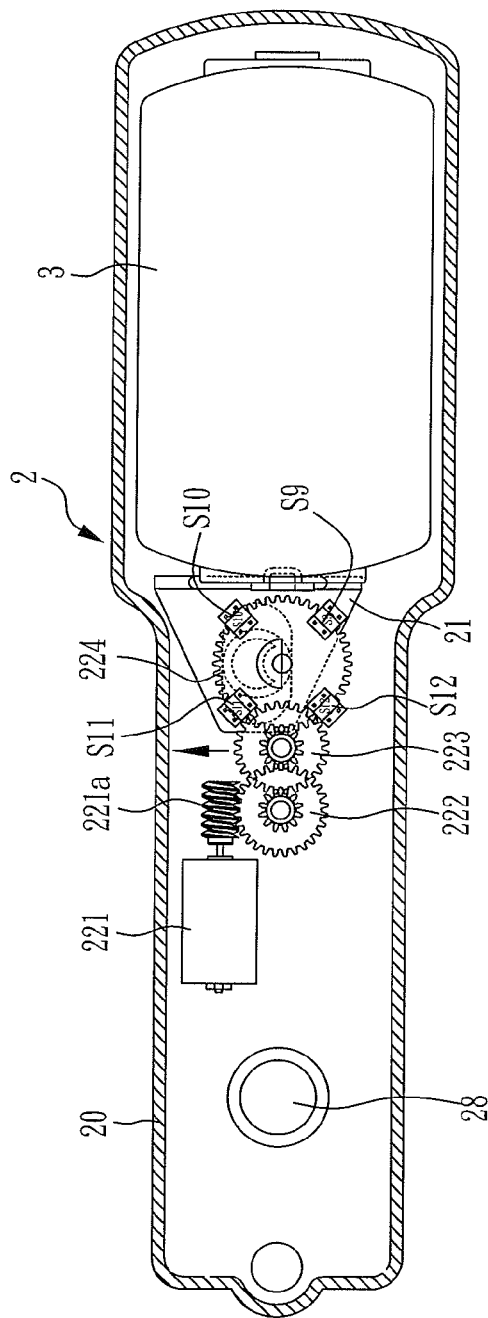
Figure 5B:
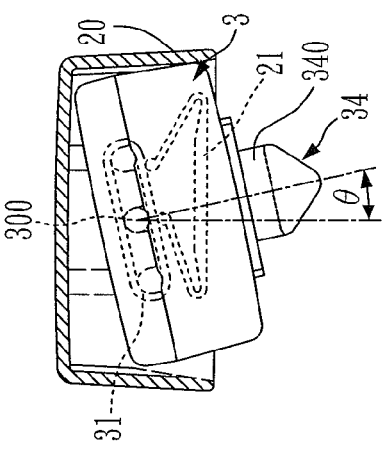

As shown in FIGS. 5A and 5B, when the sway control member 21 is moved by the driving mechanism 22 so as to rotate the swaying mechanism 3 along a rotary axis 300 on the rotating connection 31. The two leaf springs 212a and 212b can provide elasticity for the swaying mechanism 3 rotating back when the driving mechanism 22 drives again to move the sway control member 21 in an opposite direction (as shown in FIGS. 6A and 6B).

Refer back to FIG. 3. Preferably, the portion 2240 of the driving mechanism 22 is a portion of a cam 224, and the driving mechanism 22 may comprises one gear 222 (or more gears 222 and 223) engaged with the cam 224, and a motor 221 comprising a bolt 221a in one end of the motor 221 for driving the gear 222.

Please refer to FIGS. 4A, 4B, 5A, and 5B. The transport arm device 2 may further comprise a main body housing 20 for covering the driving mechanism 22 and the sway control member 21. The suspension 24 is extended from a top plane (not shown) of the main body housing 20. As shown in FIGS. 5B and 6B, the main body housing 20 limits the swaying mechanism 3 to be rotated within a specific angle θ. The angle θ can be designed according to the tray 910 or 920 (shown in FIG. 2) with a different size of the main body housing 20 and the corresponding size of the swaying mechanism 3.

As shown in FIGS. 5B and 6B, the transport arm device 2 may further comprise a fourth sensor S10 and a fifth sensor S12 for sensing the swaying mechanism 3 being rotated in forward and backward directions respectively.

As shown in FIG. 4A, 5A, or 6A, the transport arm device 2 comprises a through hole 28 to be engaged with a vertical control bolt 100 (shown in FIG. 2) so the transport arm device 2 can be moved rotationally between two or more processing systems 91 and 92. The transport arm device 2 may further comprise a sixth sensor S9 and a seventh sensor S11 for sensing the transport arm device 2 rotated in left and right directions respectively.

Figure 7:
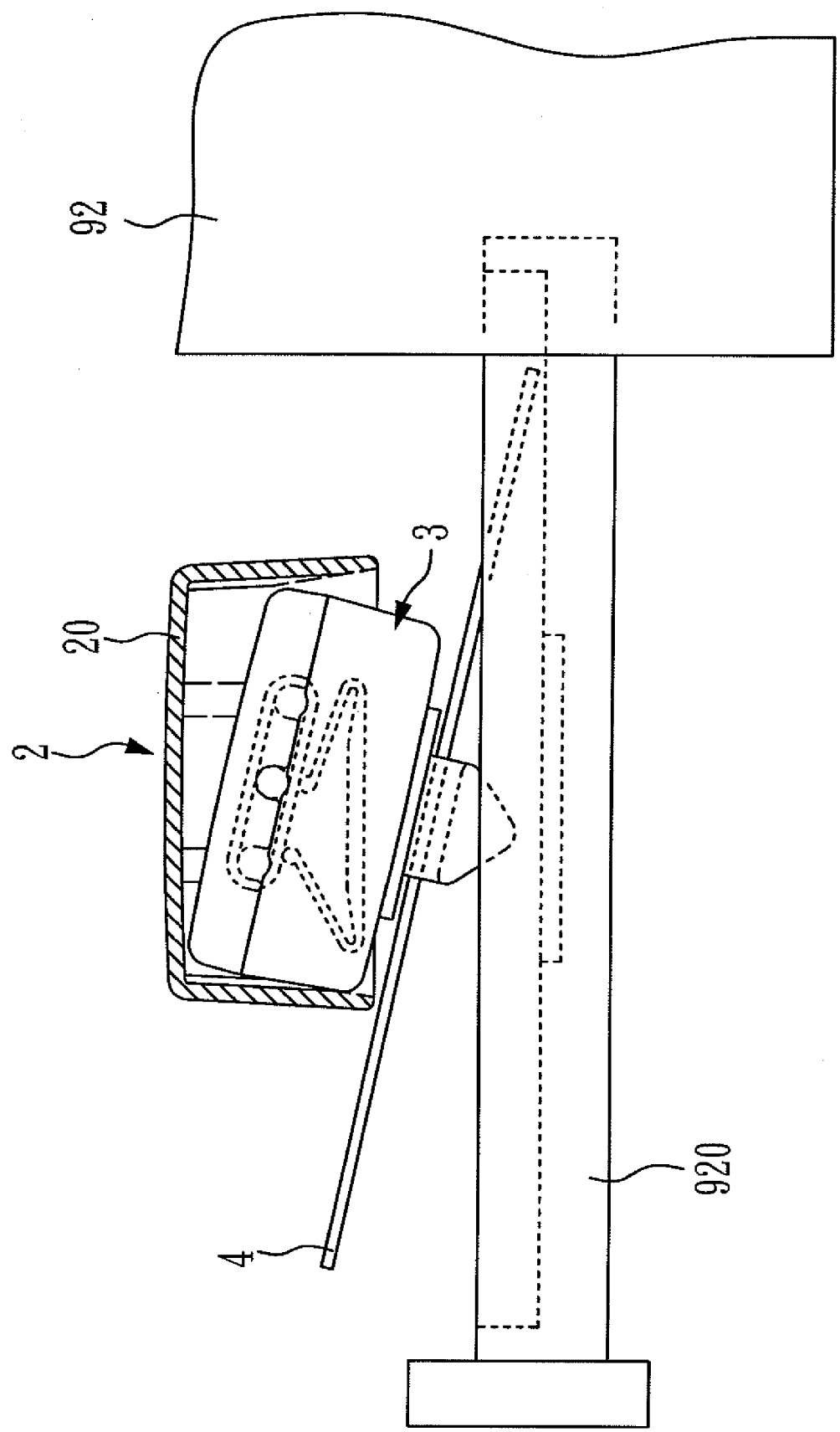
FIG. 7 is a part cross-section view of the transport arm device, which shows how a disc to be put into a disc tray.

As shown in FIG. 7, the transport arm device 2 according to the present invention can be used for pulling the disc 4 into the tray 920 with a specific angle. Thus, even though the tray 920 is not extended completely from the processing system 92, the disc 4 can be put into the tray by using the transport arm device 2 of the present invention.

Figure 8:
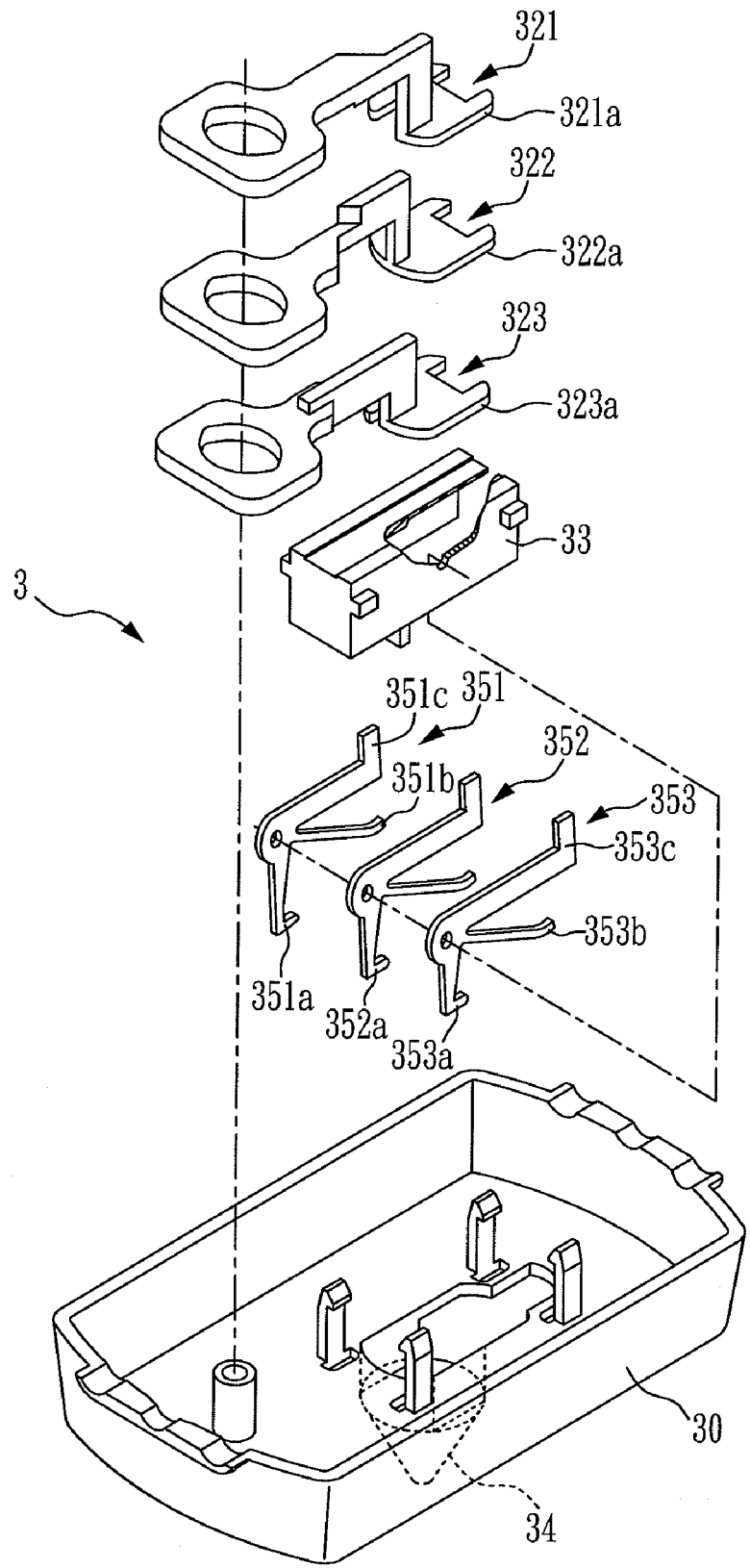
FIG. 8. is a part of swaying mechanism, which is an exploded view of grabbing controllers and moving elements according to the present invention.
Figure 9:
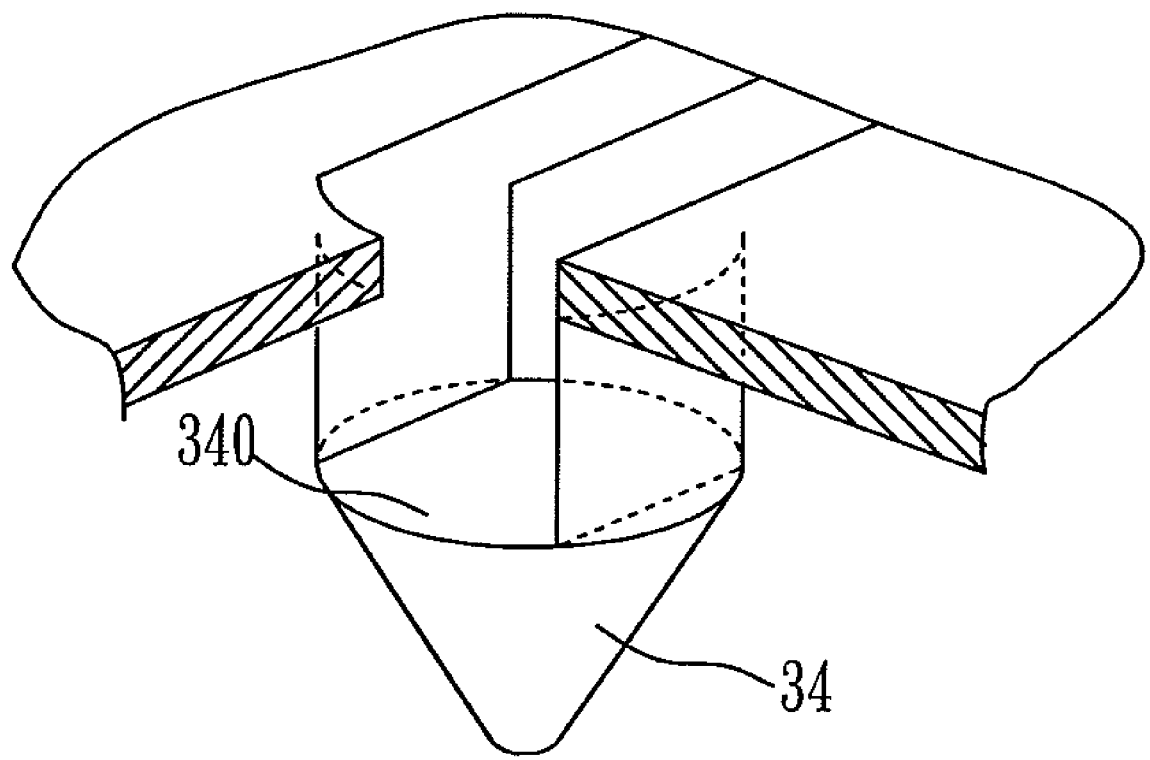
FIG. 9 is an enlarge view of a cone-shaped carrying head of the swaying mechanism in accordance with the present invention.

Please refer to FIG. 8. The swaying mechanism 3 comprises the swaying mechanism housing 30, grabbing controllers 321-323, and moving elements 351-353. The swaying mechanism housing 30 comprises a cone-shaped carrying head 34 extending out from the swaying mechanism housing 30. Each of the grabbing controllers 321-323 comprises a disc grabbing portion 321a-323a respectively disposed in the cone-shaped carrying head 34. Each of the moving elements 351-353 comprises a pushing portion 351a-353a respectively disposed in the cone-shaped carrying head 34. Refer to FIG. 9, the cone-shaped carrying head 34 comprises an opening 340 for receiving the disc 4 when each disc grabbing portion 321a-323a is being pushed by the pushing portion 351a-353a.

Figure 10A:
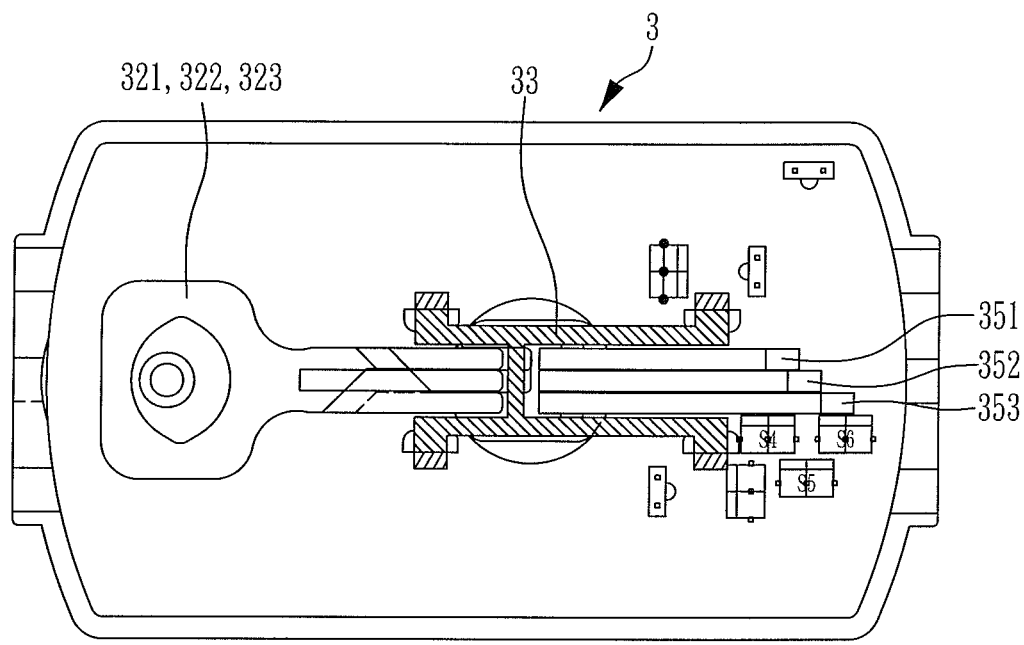
FIGS. 10A-10B 11A-11C, 12A-12B, and 13A-13B are cross-section views of a swaying mechanism in accordance with the present invention when carrying disc(s).
Figure 10B:
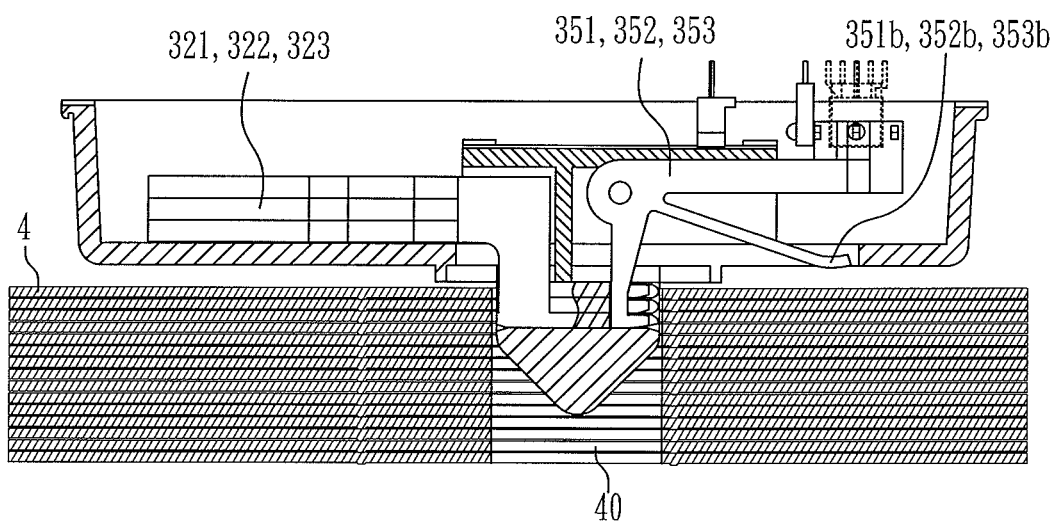
Figure 11A:
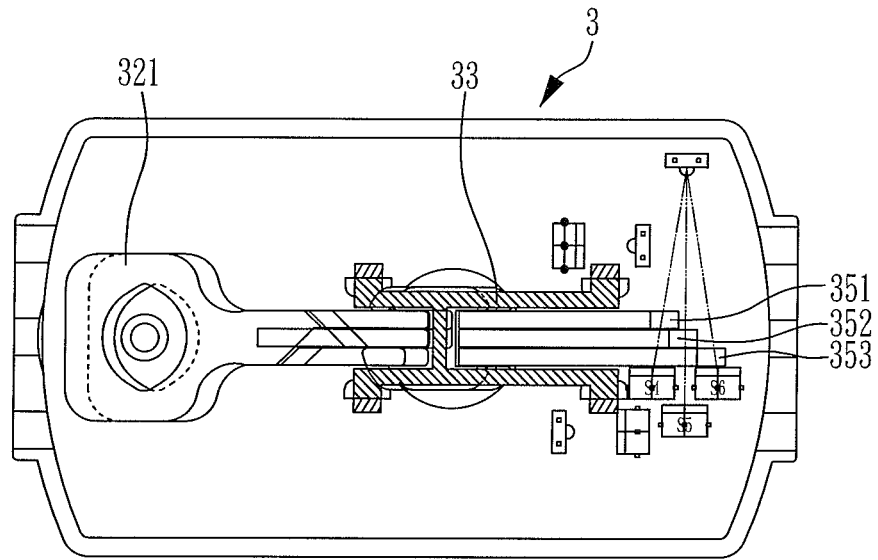
Figure 11B:
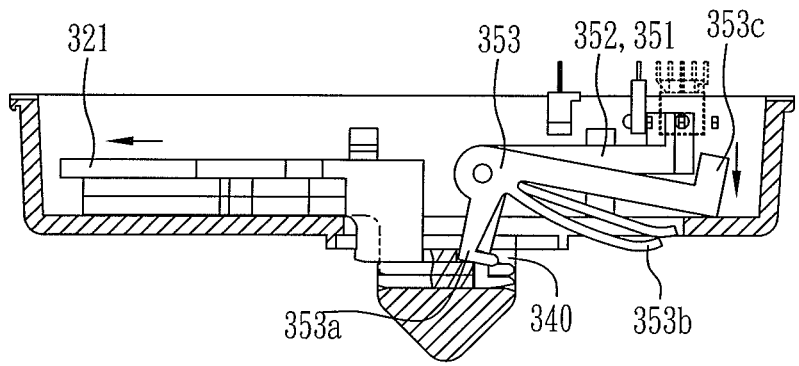
Figure 11C:
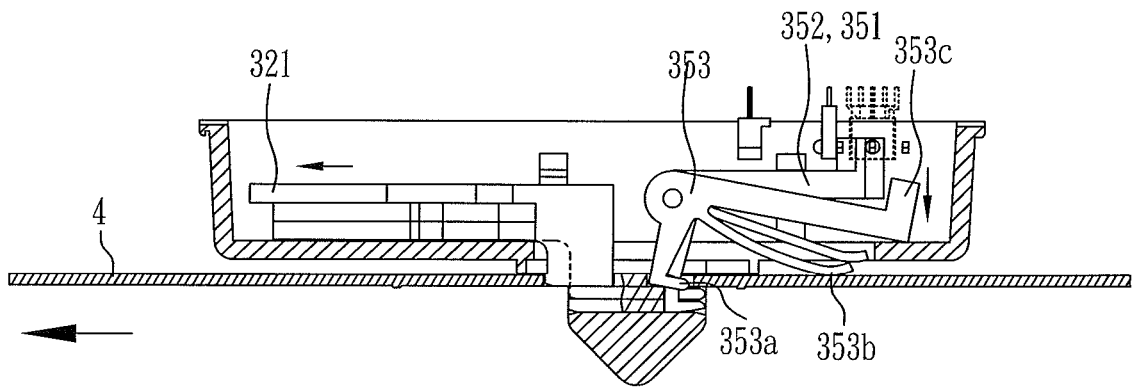
Figure 12A:
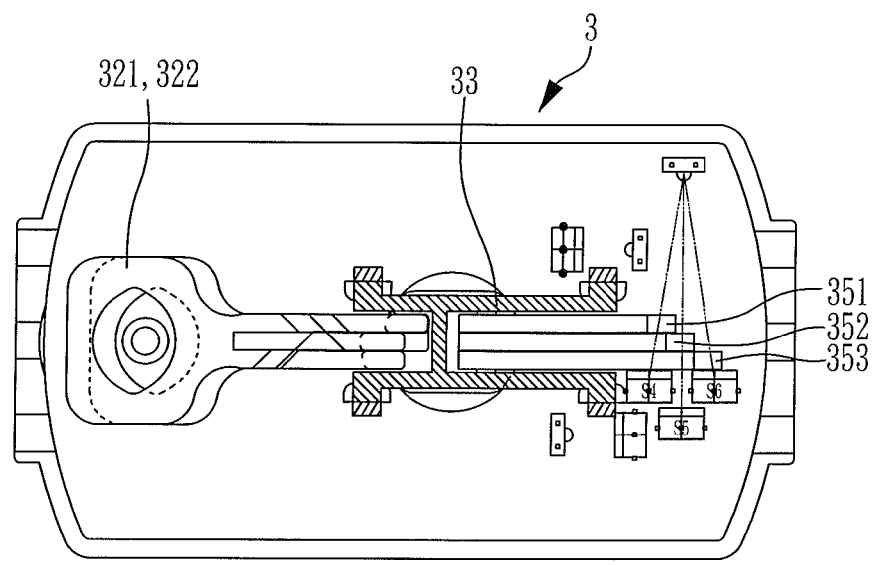
Figure 12B:
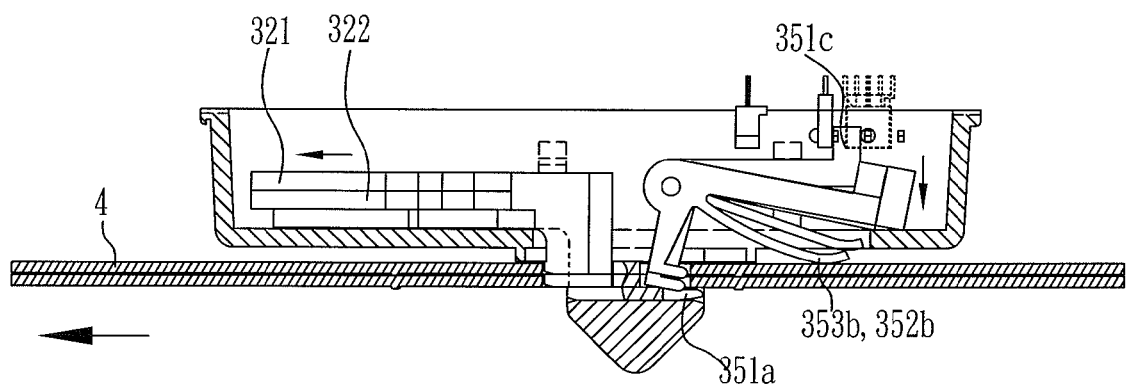
Figure 13A:
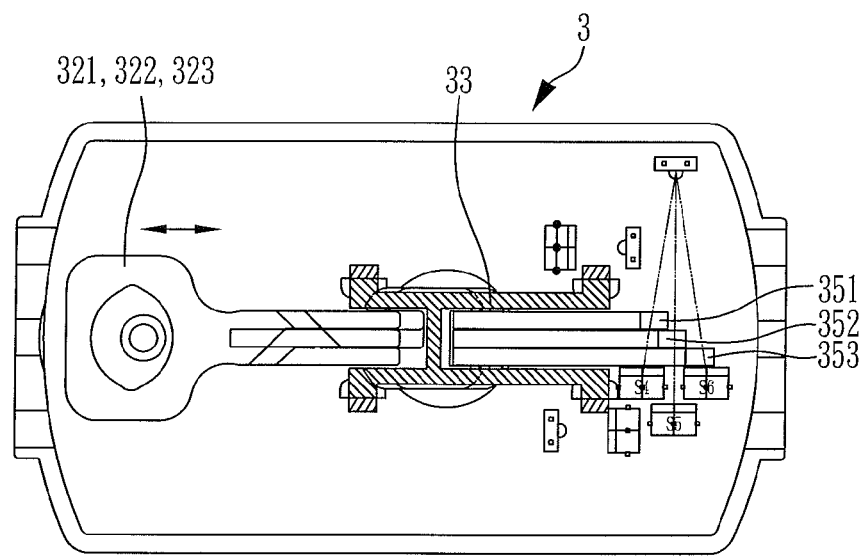
Figure 13B:
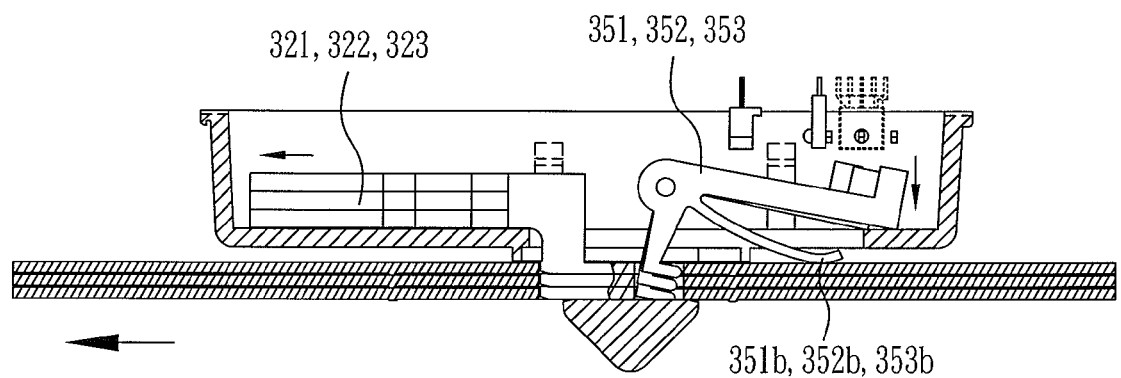

Please refer to FIGS. 10A and 10B. The cone-shaped carrying head 34 is moved to be disposed in the central holes 40 of the discs 4. When picking one disc 4, as shown in FIG. 11A-11C, the moving element 353 is moved according to a control (not shown) controlling an end 353c (shown in FIG. 8) of the moving elements 353. Thus, the pushing portion 353a of the moving elements 353 pushes the disc grabbing portion 321a, and the first disc 4 is moved accordingly. Similarly, ends 351c and 352c (shown in FIG. 8) of the moving elements 351 and 352 can be controlled to move the moving elements 351 and 352 respectively. The opening 340 (shown in FIG. 11B) can be disposed with a part of the first disc 4. Thus, the first disc 4 is moved in accordance with the movement of the disc grabbing portion 321a pushed by the pushing portion 353a, as shown in FIG. 11C. An elastic portion 353b of the moving element 353 can provide elastic force for returning the moving element 353 back to the original position for dropping the disc 4. Similarly, elastic portions 351b and 352b of the moving elements 351 and 352 can provide elastic force for returning the moving elements 351 and 352 back respectively, as shown in FIGS. 8, 10B, 12B and 13B.

In this embodiment, referring back to FIG. 8, the swaying mechanism 3 may further comprise a fixing member 33 for fixing the moving elements 351-353 and the grabbing controllers 321-323, and the fixing member 33 is fastened in the swaying mechanism housing 30.

Please refer to FIGS. 12A-12B and FIGS. 13A-13B. Similarly, the grabbing controllers 322 and 323 and moving elements 352 and 351 can be controlled to be moved for carrying two discs and three discs respectively. Thus, the swaying mechanism 3 of the present invention can carry more than one disc at one time, if necessary. The quantity of the discs 4 to be carried can be designed according to the grabbing controllers 321-323 and moving elements 351-353.

When there are three discs 4 to be carried, as shown in FIGS. 10A, 11A, 12A, and 13A, the swaying mechanism 3 comprises a first sensor S4 for sensing the first disc of the three discs, a second sensor S5 for sensing the second disc of the three discs, and a third sensor S6 for sensing the third disc of the three discs.

The driving mechanism 22 of the present invention can be driven by the control (not shown) so as to move the sway control member 21. The control can also control the swaying mechanism 3 for moving the grabbing controllers 321-323 and moving elements 351-353. The sensors S4-S6 or S9-S12 is connected with the control and can be used to sense the movement of the sway control member 21 and the swaying mechanism 3. The control means is well known in this art. Thus, the description of the control is not required.

Although the present invention has been explained in relation to its preferred embodiment, it is to be understood that many other possible modifications and variations can be made without departing from the spirit and scope of the invention as hereinafter claimed.

What is claimed is:

1. A transport arm device for carrying at least one disc comprising:
    a main body housing rotationally mounted about a vertical axis, with the main body housing including a suspension;
    a driving mechanism mounted to the main body housing;
    a sway control member having a hole substantially in a middle of the sway control member for receiving a portion of the driving mechanism;
    two leaf springs extending up from two sides of the sway control member respectively; and
    a swaying mechanism for grabbing the at least one disc, with the swaying mechanism having a rotating connection about a rotary axis for engaging with the suspension, with the rotary axis being perpendicular to the vertical axis, wherein the two leaf springs are contacted with the swaying mechanism on two sides of the rotary axis respectively;
    whereby the sway control member is moved by the driving mechanism so as to rotate the swaying mechanism along the rotary axis on the rotating connection, and the two leaf springs provide elasticity for the swaying mechanism rotating back.

2. The transport arm device as claimed in claim 1, wherein the portion of the driving mechanism is a cam, and the driving mechanism comprises a gear engaged with the cam and a motor comprising a bolt in one end of the motor for driving the gear.

3. The transport arm device as claimed in claim 1, wherein the main body housing covers the driving means and the sway control member, wherein the suspension is extended from a top plane of the main body housing, and the main body housing limits the swaying mechanism to be rotated within a specific angle.

4. A transport arm device for carrying at least one disc comprising:
    a driving mechanism;
    a sway control member having a hole substantially in a middle of the sway control member for receiving a portion of the driving mechanism and two leafs springs extending up from two sides of the sway control member respectively; and
    a swaying mechanism for grabbing the at least one disc, the swaying mechanism having a rotating connection for engaging with a suspension, wherein the two leaf springs are contacted with the swaying mechanism;
    whereby the sway control member is moved by the driving mechanism so as to rotate the swaying mechanism along a rotary axis on the rotating connection, and the two leaf springs provide elasticity for the swaying mechanism rotating back, wherein the two leaf springs are contacted with the rotating connection, and the rotating connection is extruded out of a swaying mechanism housing of the swaying mechanism.

5. A transport arm device for carrying at least one disc comprising:
    a driving mechanism;
    a sway control member having a hole substantially in a middle of the sway control member for receiving a portion of the driving mechanism and two leaf springs extending up from two sides of the sway control member respectively; and
    a swaying mechanism for grabbing the at least one disc, the swaying mechanism having a rotating connection for engaging with a suspension, wherein the two leaf springs are contacted with the swaying mechanism;
    whereby the sway control member is moved by the driving mechanism so as to rotate the swaying mechanism along a rotary axis on the rotating connection, and the two leaf springs provide elasticity for the swaying mechanism rotating back, wherein the swaying mechanism comprises a swaying mechanism housing having a cone-shaped carrying head extending out from the swaying mechanism housing, at least one grabbing controller having a disc grabbing portion disposed in the cone-shaped carrying head, and at least one moving element having a pushing portion disposed in the cone-shaped carrying head; and wherein the cone-shaped carrying head comprises an opening for receiving the at least one disc when the disc grabbing portion is being pushed by the pushing portion.

6. The transport arm device as claimed in claim 5, wherein the swaying mechanism comprises a fixing member for fixing the at least one moving element and the at least one grabbing controller, and the fixing member is fastened in the swaying mechanism housing.

7. The transport arm device as claimed in claim 5, wherein the at least one disc comprises three discs, and the swaying mechanism comprises a first sensor for sensing the first disc of the three discs, a second sensor for sensing the second disc of the three discs, and a third sensor for sensing the third disc of the three discs.

8. A transport arm device for carrying at least one disc comprising:
    a driving mechanism;
    a sway control member having a hole substantially in a middle of the sway control member for receiving a portion of the driving mechanism and two leaf springs extending up from two sides of the sway control member respectively;
    a swaying mechanism for grabbing the at least one disc, the swaying mechanism having a rotating connection for engaging with a suspension, wherein the two leaf springs are contacted with the swaying mechanism;
    whereby the sway control member is moved by the driving mechanism so as to rotate the swaying mechanism along a rotary axis on the rotating connection, and the two leaf springs provide elasticity for the swaying mechanism rotating back; and
    a fourth sensor and a fifth sensor for sensing the swaying mechanism being rotated in forward and backward directions respectively.

9. A transport arm device for carrying at least one disc comprising:
    a driving mechanism;
    a sway control member having a hole substantially in a middle of the sway control member for receiving a portion of the driving mechanism and two leaf springs extending up from two sides of the sway control member respectively;

a swaying mechanism for grabbing the at least one disc the swaying mechanism having a rotating connection for engaging with a suspension, wherein the two leaf springs are contacted with the swaying mechanism;

whereby the sway control member is moved by the driving mechanism so as to rotate the swaying mechanism along a rotary axis on the rotating connection, and the two leaf springs provide elasticity for the swaying mechanism rotating back; and a through hole to be engaged with a vertical control bolt so as to rotationally move the transport arm device between two or more processing systems.

10. The transport arm device as claimed in claim 9 further comprising a sixth sensor and a seventh sensor for sensing the transport arm device in left and right directions respectively.

11. The transport arm device as claimed in claim 1, wherein the two leaf springs are contacted with the rotating connection, and the rotating connection is extruded out of a swaying mechanism housing of the swaying mechanism.

12. The transport arm device as claimed in claim 1, wherein the swaying mechanism comprises a swaying mechanism housing having a cone-shaped carrying head extending out from the swaying mechanism housing, at least one grabbing controller having a disc grabbing portion disposed in the cone-shaped carrying head, and at least one moving element having a pushing portion disposed in the cone-shaped carrying head; and wherein the cone-shaped carrying head comprises an opening for receiving the at least one disc when the disc grabbing portion is being pushed by the pushing portion.

13. The transport arm device as claimed in claim 12, wherein the swaying mechanism comprises a fixing member for fixing the at least one moving element and the at least one grabbing controller, and the fixing member is fastened in the swaying mechanism housing.

14. The transport arm device as claimed in claim 12, wherein the at least one disc comprises three discs, and the swaying mechanism comprises a first sensor for sensing the first disc of the three discs, a second sensor for sensing the second disc of the three discs, and a third sensor for sensing the third disc of the three discs.

15. The transport arm device as claimed in claim 1 further comprising a fourth sensor and a fifth sensor for sensing the swaying mechanism being rotated in forward and backward directions respectively.

16. The transport arm device as claimed in claim 1 further comprising a through hole to be engaged with a vertical control bolt so as to rotationally move the transport arm device between two or more processing systems.

17. The transport arm device as claimed in claim 16 further comprising a sixth sensor and a seventh sensor for sensing the transport arm device in left and right directions respectively.

* * * * *